United States Patent [19]

Shimamune et al.

[11] Patent Number: 5,417,257
[45] Date of Patent: May 23, 1995

[54] METHOD AND APPARATUS FOR INJECTING LIQUID CRYSTAL

[75] Inventors: Masayuki Shimamune, Tokyo; Takashi Enomoto, Sagamihara; Tatsuo Murata, Isehara; Mutsuo Mitsui, Hachiohji, all of Japan

[73] Assignee: Canon Kabushiki Kaisha, Tokyo, Japan

[21] Appl. No.: 165,848

[22] Filed: Dec. 14, 1993

[30] Foreign Application Priority Data

Dec. 25, 1992 [JP] Japan ................... 4-357906

[51] Int. Cl.6 .......................................... G02F 1/05
[52] U.S. Cl. ........................................ 141/8; 141/7; 141/11; 141/31; 141/65; 141/82
[58] Field of Search ............... 141/1, 4, 5, 7, 8, 11, 141/31, 51, 65, 67, 82

[56] References Cited

U.S. PATENT DOCUMENTS

| | | | |
|---|---|---|---|
| 4,099,550 | 7/1978 | Matsuzaki et al. | 141/51 |
| 5,029,623 | 7/1991 | Brosig | 141/7 |
| 5,150,239 | 9/1992 | Watanabe et al. | 359/80 |
| 5,269,351 | 12/1993 | Yoshihara | 141/7 |
| 5,285,300 | 2/1994 | Suzuki et al. | 359/54 |

FOREIGN PATENT DOCUMENTS 61-35429  2/1986  Japan .

*Primary Examiner*—J. Casimer Jacyna
*Attorney, Agent, or Firm*—Fitzpatrick, Cella, Harper & Scinto

[57] ABSTRACT

A smectic liquid crystal is injected into a liquid crystal panel according to the vacuum injection scheme. The liquid crystal is applied over an injection port of a blank panel while maintaining the panel at a temperature below a temperature at which the liquid crystal shows a fluidity and controlling the liquid crystal at a viscosity of 0.0005–0.005 kg/ms. As a result, an appropriate amount of the liquid crystal can be applied, thereby providing a liquid crystal panel free from inversion of bubbles and good and uniform alignment free from alignment failure.

6 Claims, 3 Drawing Sheets

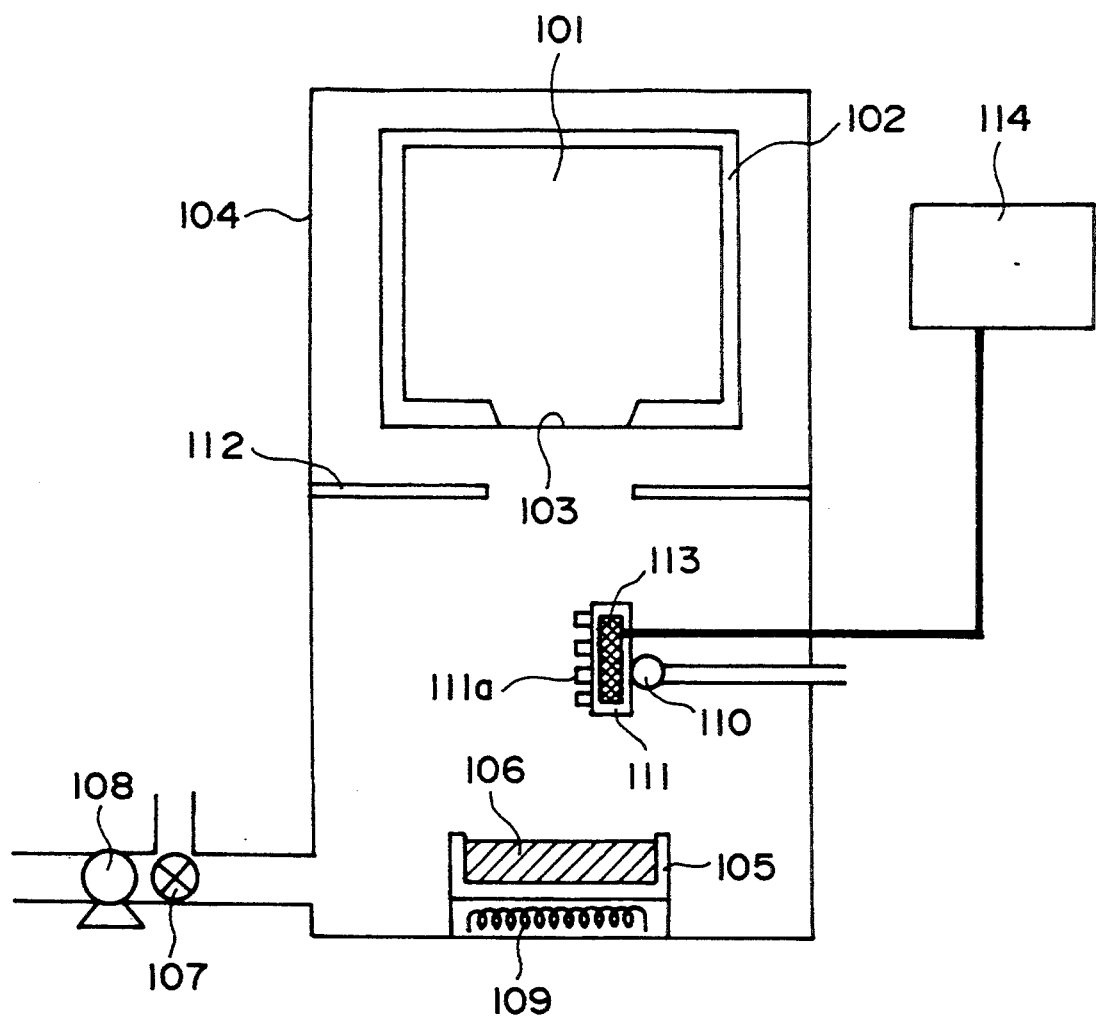
F I G. 1

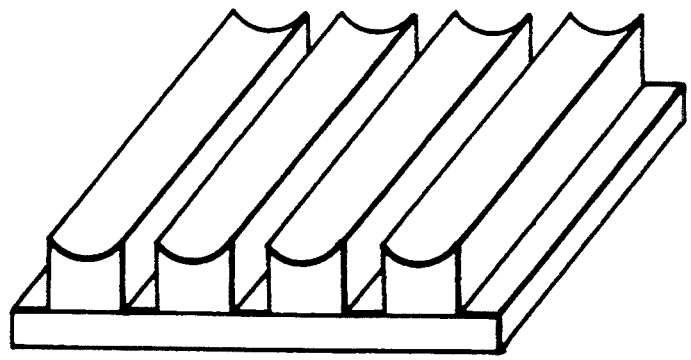
F I G. 3

METHOD AND APPARATUS FOR INJECTING LIQUID CRYSTAL

FIELD OF THE INVENTION AND RELATED ART

The present invention relates to production of a liquid crystal panel usable for image display, etc., more particularly to a method and an apparatus for injecting a liquid crystal into a panel by the vacuum injection scheme utilizing the viscosity of the liquid crystal.

Hitherto, a smectic liquid crystal or a ferroelectric liquid crystal has been injected into a liquid crystal panel by the vacuum injection scheme as utilized for nematic liquid crystals. An injection apparatus used for the vacuum injection scheme may for example have a structure as illustrated in FIG. 2. The apparatus includes a vacuum chamber 104 in which a liquid crystal panel 101 is disposed with its injection port 103 directed downward, and a liquid crystal pan 105 containing a liquid crystal 106 is disposed at the bottom. Below the liquid crystal pan 105 is disposed a heater 109 to control the temperature of the liquid crystal. Generally above the liquid crystal panel 101 is disposed an applicator 111 for applying the liquid crystal onto the injection port 103. The applicator 111 is held invertible upside down by an applicator rotator 110 and movable up and down by an applicator elevator (not shown).

For the liquid crystal injection, the vacuum chamber 104 is set in vacuum and the interior of the liquid crystal panel 101 is reduced in pressure. Then, the applicator 111 is caused to contact the liquid crystal 106 on the liquid crystal pan 105 so as to attach the liquid crystal thereto. The viscosity of the liquid crystal at this time is ordinarily set to 0.001–0.004 kg/ms. Then, the applicator 111 is moved upward, and the viscosity of the liquid crystal attached to the applicator is adjusted to 0.01–0.02 kg/ms. Then, the liquid crystal is applied onto the injection port 103 of the panel 101 and heated by a heater provided therefor to lower the viscosity, thereby injecting the liquid crystal into the panel 101 by utilizing the capillary effect. Further, the pressure within the vacuum chamber 104 is restored to the atmospheric pressure to complete the liquid crystal injection by utilizing the resultant pressure difference.

There has been proposed a method of applying a smectic liquid crystal over the injection port of a liquid crystal cell while heating the liquid crystal into isotropic phase. (Japanese Laid-Open Patent Application (JP-A) 61-35429).

According to the conventional liquid crystal injection method, the smectic liquid crystal applied to the injection port is placed in isotropic phase or cholesteric phase, thus having an unstable fluidity. As a result, before shifting into the injection step, the liquid crystal is partly injected into the panel so that it has been difficult to control the application amount thereof to the injection port. In case where the application amount is insufficient, the atmospheric air is liable to enter through the injection port to destroy the vacuum within the panel, thus causing liquid crystal injection failure. If the application amount is excessive, the liquid crystal is liable to enter up to the display region of the panel in the application step, thereby causing an alignment failure.

SUMMARY OF THE INVENTION

An object of the present invention is to provide a method and apparatus allowing a stable liquid crystal injection, so as to solve the above-mentioned problems.

According to the present invention, there is provided a method of injecting a smectic liquid crystal into a liquid crystal panel by vacuum injection scheme, comprising: applying the liquid crystal over an injection port of a blank panel, while maintaining the panel at a temperature below a temperature at which the liquid crystal shows a fluidity and controlling the liquid crystal at a viscosity within the range of 0.0005–0.005 kg/ms. In a preferred embodiment of the present invention, a ferroelectric liquid crystal is injected into a liquid crystal panel according to the vacuum injection scheme through sequential steps of heating the liquid crystal within a liquid crystal pan disposed within a vacuum chamber at a temperature providing isotropic phase of the liquid crystal, attaching the liquid crystal in the isotropic phase to an applicator held at room temperature, heating the liquid crystal on the applicator to or above a temperature providing the isotropic phase of the liquid crystal to thereby level the liquid crystal thereon, and applying the liquid crystal after natural cooling over the injection port of the panel. It is further preferred that the liquid crystal is applied over the injection port of the panel at a viscosity of 0.0007–0.0009 kg/ms.

According to a second aspect of the present invention, there is provided an liquid crystal injection apparatus suitable for practicing the above liquid crystal injection method and an applicator equipped with temperature control means. It is preferred that the applicator has a liquid crystal-carrying surface forming an arcuate groove and coated with a fluorine-containing resin so as to facilitate the application of an optimum amount of the liquid crystal over the injection port.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 illustrates a liquid crystal injection apparatus according to an embodiment of the present invention.

FIG. 3 is a perspective view showing a liquid crystal-carrying surface of an applicator suitably used in the present invention.

DESCRIPTION OF THE PREFERRED EMBODIMENTS

Figure 2:
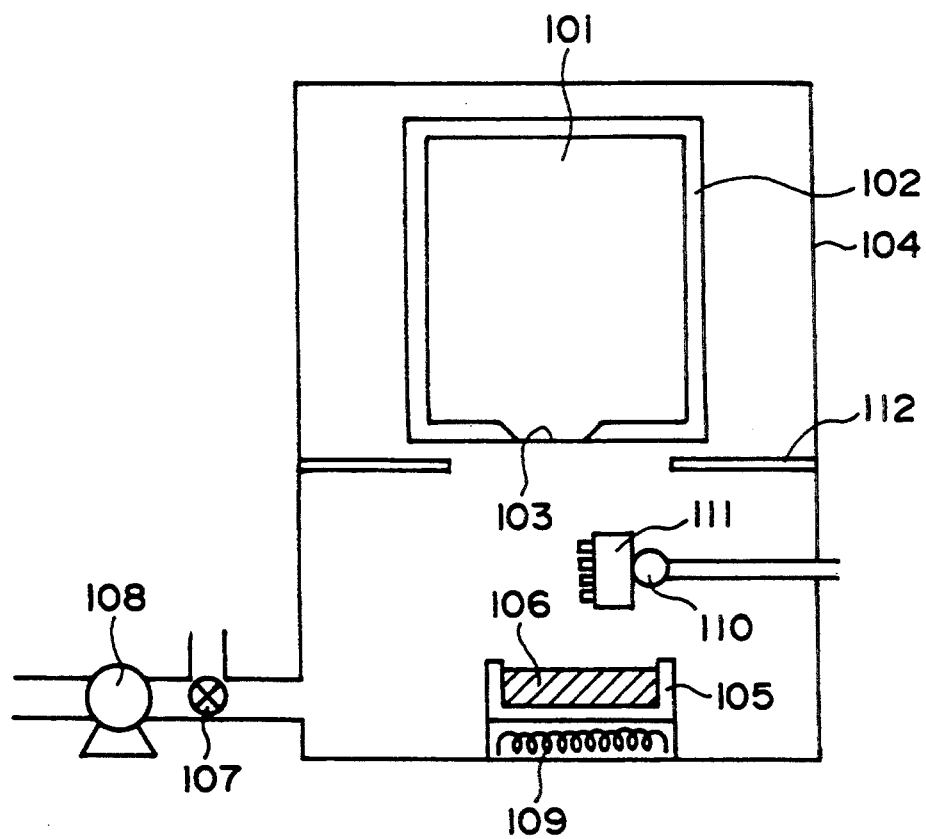
FIG. 2 illustrates a conventional liquid crystal injection apparatus.

An embodiment according to a fist aspect of the present invention will now be described.

EXAMPLE 1

A blank liquid crystal panel 101 as shown in FIG. 1 having a 40 mm-wide injection port 103, an about 4 mm-wide sealing part 102 and a panel gap of 1.4 $\mu$m, was prepared. A liquid crystal used for filling the panel was a pyrimidine-based ferroelectric liquid crystal showing viscosities of 0.125 kg/ms at 10° C., 0.044 kg/ms at 30° C., 0.014 kg/ms at 50° C., 0.002 kg/ms at 90° C. and 0.0003 kg/ms at 100° C. The liquid crystal was injected into the blank panel by using a vacuum injection apparatus as shown in FIG. 1.

Referring to FIG. 1, a blank panel 101 as described above and a liquid crystal pan 105 containing liquid crystal 106 as described above were placed within a vacuum chamber 104. Then, the interior of the vacuum chamber 104 was evacuated to vacuum by a vacuum pump 108 through open vent valve 107 and simultaneously the liquid crystal 106 within the pan 105 was heated by a heater below the pan 105 to 105° C., thereby causing the liquid crystal to show a viscosity of 0.002 kg/ms. Then, an Al-made applicator 111 having a liquid crystal-carrying surface 111a was driven by an applicator elevator (not shown) and an applicator rotator 110 so as to have the liquid crystal 106 attach the liquid crystal onto the surface 111a. Then, the applicator 111 was inverted by an angle of 180 degrees and elevated by the applicator elevator at a rate of 60 cm/min to apply the liquid crystal over the injection port 103 of the panel 101. Before the application, however, a heater 113 embedded within the applicator 111 was temperature-controlled by an external controller 114 to control the liquid crystal at a temperature of 90° C. and a viscosity of 0.002 kg/ms.

As a result, an appropriate amount of the liquid crystal could be applied over the injection port 103 of the panel 101, so that the liquid crystal was satisfactorily injected into the panel 101 by restoring the pressure within the vacuum chamber 104 to the atmospheric pressure, without causing an injection failure due to invasion of the atmospheric air or an alignment failure due to entering of the liquid crystal up to the display region already at the time of the liquid crystal application due to application of an excessive amount of the liquid crystal over the injection port.

Comparative Example 1

The liquid crystal injection was performed in a similar manner as in Example 1 except that the liquid crystal was applied over the injection port 103 of the liquid crystal panel 101 at a viscosity of 0.008 kg/ms (75° C.) outside the prescribed range of 0.0005–0.005 kg/ms. As a result, the vacuum within the panel was not retained until the completion of the filling by invasion of the atmospheric air into the panel, thus causing an injection failure.

On the other hand, the applicator 111 was elevated faster than in Example 1 to apply the liquid crystal at a viscosity of 0.0003 kg/ms (100° C.), whereby the liquid crystal entered up to the display region of the panel already at the time of the application and resulted in an alignment failure after complete filling of the liquid crystal by the restoration of the atmospheric pressure within the vacuum chamber 104.

EXAMPLE 2

Figure 4:
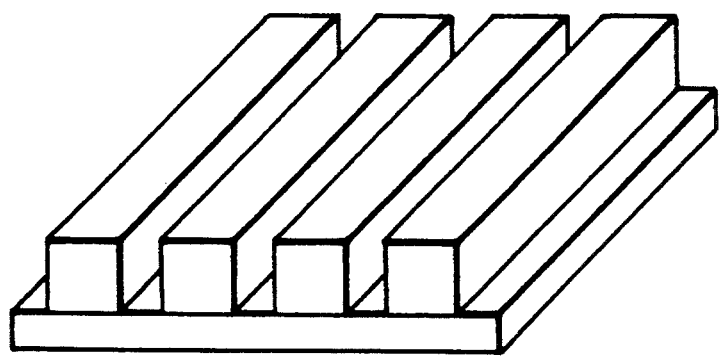
FIG. 4 is a perspective view showing a liquid crystal-carrying surface of a conventional applicator.

An applicator having an Al-made liquid crystal-carrying surface provided with arcuate grooves as shown in FIG. 3 in contrast with conventional flat surfaces as shown in FIG. 4 and coated with polytetrafluoroethylene was used as an applicator 111 in the vacuum injection apparatus shown in FIG. 1. A pyrimidine-based mixture ferroelectric liquid crystal showing the following phase transition series was injected into a blank panel 101.

Cryst.: crystal phase,
SmC*: chiral smectic C phase,
SmA: smectic A phase,
Ch.: cholesteric phase,
Iso.: isotropic phase.

A blank panel 101 was first disposed within a vacuum chamber 104. Then, a shutter 112 was closed, a panel-side chamber was reduced in pressure to $10^{-3}$ Torr and then the evacuation was further continued for 12 hours. On the other hand, the above-mentioned liquid crystal 106 was placed on a liquid crystal pan 105 and heated into isotropic phase at 95° C. by a heater 109. Then, a lower half of the liquid crystal chamber 104 was reduced to $10^{-3}$ Torr, and a liquid crystal-carrying surface 111a of the applicator held at room temperature was dipped within the liquid crystal 106 on the liquid crystal pan 105 and pulled up gradually. Then, a heater 113 controlled by an external controller 114 was actuated to heat the applicator 111 at 95° C. and the liquid crystal applied onto the applicator surface 111a (which had been directed upward by a rotator 110) was leveled for 10 min. so as to allow uniform application.

After the leveling, the liquid crystal was naturally cooled to a viscosity of 0.0007–0.0009 kg/ms. Then, the shutter 112 was opened, and the liquid crystal applied on the applicator was allowed to contact and was applied over the injection port 103 of the panel 101 held at room temperature.

Then, the liquid crystal applied over the injection port 103 was injected into the panel by restoring the atmospheric pressure within the vacuum chamber. As a result, a ferroelectric liquid crystal panel free from inclusion of bubbles and showing excellent display quality was obtained.

Comparative Example 2

The liquid crystal injection was performed in a similar manner as in Example 2 except that the liquid crystal was applied without effecting the temperature control of the applicator 111. As a result, the viscosity at the time of application was fluctuated within a broad range of 0.0001–0.02 kg/ms, thus frequently falling outside the prescribed optimum range of 0.0005–0.0005 kg/ms. Thus, in case of too low a viscosity, the liquid crystal entered up to a display region of a liquid crystal panel to result in an alignment failure.

On the other hand, in case of too high a viscosity, liquid crystal could not be applied uniformly over the injection port, thus resulting in defects of bubble inclusion within the panel.

In any case, the display quality was remarkably impaired.

As described above, according to the present invention, a liquid crystal can be injected into a liquid crystal panel well and uniformly without causing inclusion of bubbles within the injected liquid crystal or causing an alignment failure, whereby liquid crystal panels of a high quality can be produced at a high reliability. Thus, the liquid crystal panels can be produced at a higher yield and at a higher production efficiency, thus resulting in a lower production cost.

What is claimed is:

1. A method of injecting a smectic liquid crystal into a liquid crystal panel by vacuum injection scheme, comprising sequential steps of:

heating the liquid crystal within a liquid crystal pan disposed within a vacuum chamber at a temperature providing isotropic phase of the liquid crystal, attaching the liquid crystal in the isotropic phase to an applicator held at room temperature, heating the liquid crystal on the applicator to or above a temperature providing the isotropic phase of the liquid crystal to thereby level the liquid crystal thereon, and applying the liquid crystal after natural cooling over the injection port of a blank panel, while maintaining the panel at a temperature below a temperature at which the liquid crystal shows fluidity and controlling the liquid crystal at a viscosity within the range of 0.0005–0.005 kg/ms.

2. A method according to claim 1, wherein the liquid crystal is applied over the injection port of the panel at a viscosity of 0.0007–0.0009 kg/ms.

3. A method according to claim 1, wherein the liquid crystal is applied using an applicator equipped with a temperature control.

4. A method according to claim 3, wherein the smectic liquid crystal shows ferroelectricity.

5. A method according to claims 1, 2 or 3, wherein the liquid crystal is applied using an applicator having a liquid crystal-carrying surface comprising an arcuate groove coated with a fluorine-containing resin.

6. A method of injecting a smectic liquid crystal into a liquid crystal panel by vacuum injection scheme, comprising the steps of:

heating the liquid crystal in a pan disposed within a vacuum chamber at a temperature providing isotropic phase of the liquid crystal, attaching the liquid crystal in the isotropic phase to an applicator, heating the applicator so that the liquid crystal attached on the applicator is leveled in isotropic phase of the liquid crystal, cooling the liquid crystal in the isotropic phase to a viscosity within the range of 0.0005–0.005 kg/ms, and applying the liquid crystal to an injecting port provided to a blank panel.

* * * * *